United States Patent [19]

Bissett

[11] 4,421,193
[45] Dec. 20, 1983

[54] TREAD POWERED SKI

[76] Inventor: Fred L. Bissett, 1300 Florence St., Aurora, Colo. 80010

[21] Appl. No.: 222,601

[22] Filed: Jan. 5, 1981

[51] Int. Cl.³ .......................................... B62M 29/00
[52] U.S. Cl. ...................................... 180/192; 180/193
[58] Field of Search .............. 180/190, 192, 193, 191, 180/9.24 A, 9.5, 9.52, 9.54, 9.56

[56] References Cited

U.S. PATENT DOCUMENTS

| | | | |
|---|---|---|---|
| 1,650,334 | 11/1927 | Eliason | 180/190 |
| 1,696,125 | 12/1928 | Rantasa | 180/190 |
| 2,339,886 | 1/1944 | Shannon | 180/193 |
| 2,378,111 | 6/1945 | Tucker et al. | 180/190 |
| 2,706,528 | 4/1955 | Kallieo | 180/190 |
| 2,846,017 | 8/1958 | Luchterhand | 180/191 |
| 3,325,179 | 6/1967 | Bissett | 280/25 |
| 3,575,249 | 4/1971 | Raistakka | 180/190 |
| 3,682,495 | 8/1972 | Zaimi | 180/190 |
| 3,761,144 | 9/1973 | Perreault | 180/193 |
| 3,809,173 | 5/1974 | McLeod | 180/190 |
| 3,867,991 | 2/1975 | Brandli | 180/193 |
| 3,877,534 | 4/1975 | Krause | 180/193 |
| 4,162,088 | 7/1979 | Best | 180/190 |
| 4,175,627 | 11/1979 | Husted | 180/190 |
| 4,193,609 | 3/1980 | Bissett | 280/12 K |
| 4,260,036 | 4/1981 | Bissett | 180/182 |

FOREIGN PATENT DOCUMENTS

| | | | |
|---|---|---|---|
| 613865 | 2/1961 | Canada | 180/193 |
| 1505925 | 7/1969 | Fed. Rep. of Germany | 180/192 |
| 1909511 | 9/1970 | Fed. Rep. of Germany | 180/192 |
| 430477 | 8/1967 | Switzerland | 180/193 |

OTHER PUBLICATIONS

Sno-Runner Advertisement, p. 161, *Skiing*, Dec. 1979.

*Primary Examiner*—Joseph F. Peters, Jr.
*Assistant Examiner*—Ross Weaver
*Attorney, Agent, or Firm*—Saidman, Sterne & Kessler

[57] ABSTRACT

A self-propelled ski is powered by an engine connected to a pair of treads disposed on opposite lateral sides of the ski. The treads are mounted on a chassis which is pivotally connected to the ski and can be moved between an operative position with the treads engaging the ground surface and an inoperative position with the treads disposed above the surface.

18 Claims, 10 Drawing Figures

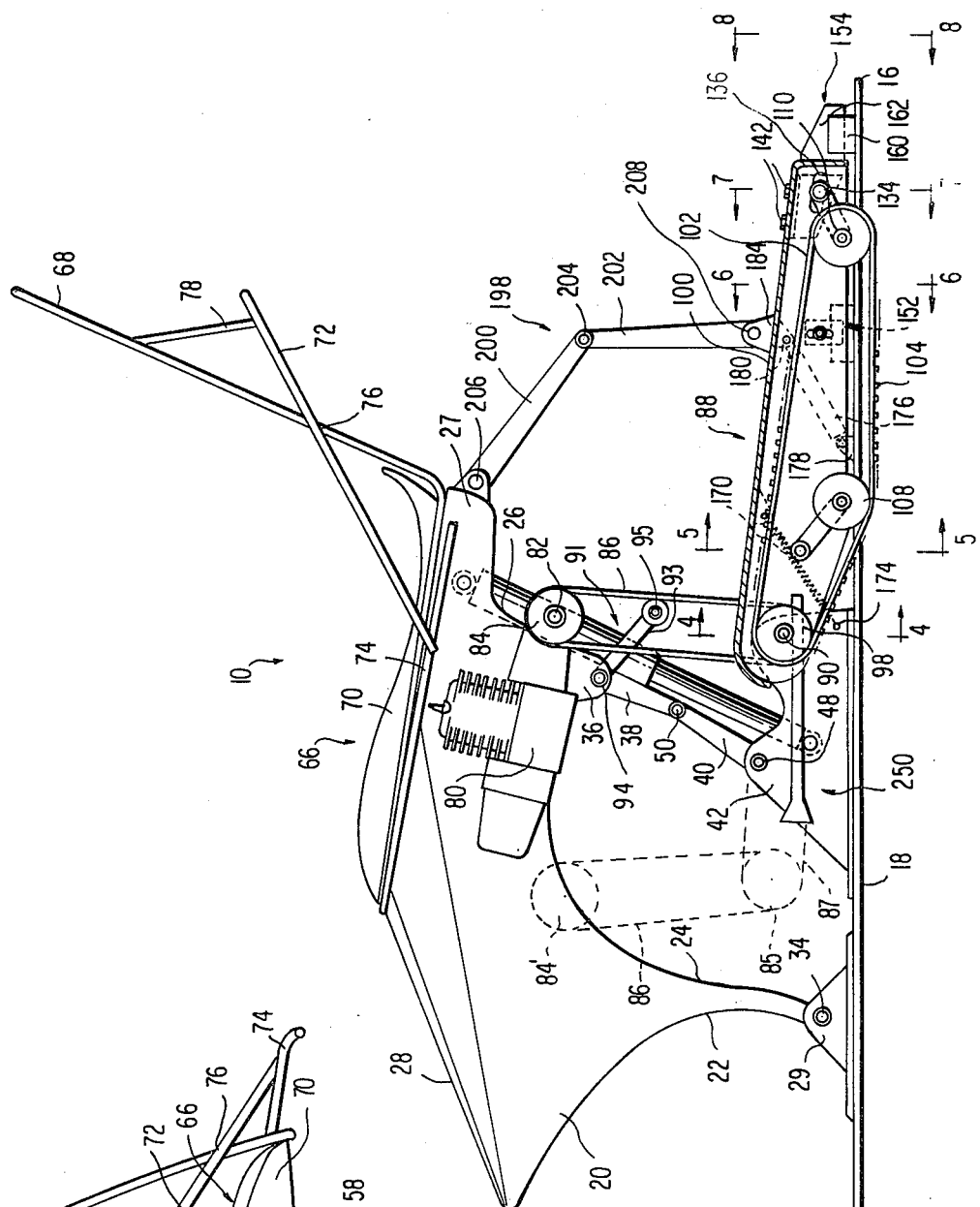
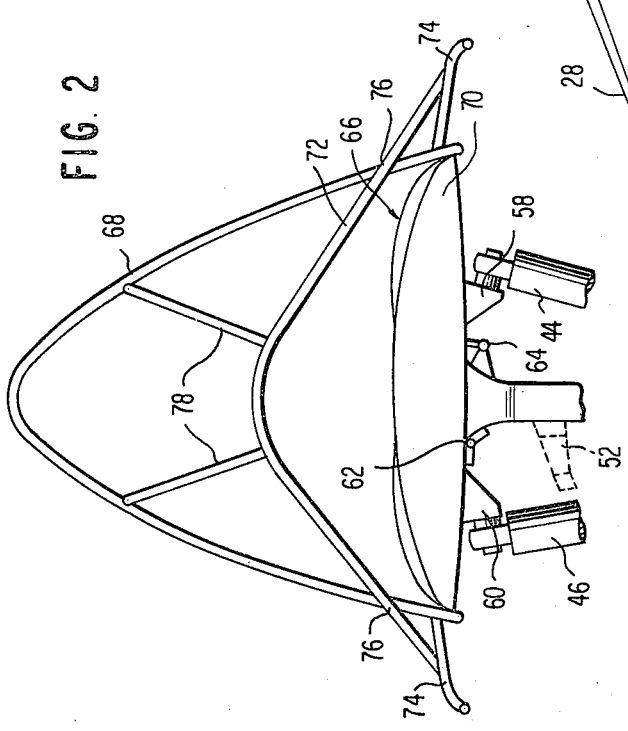

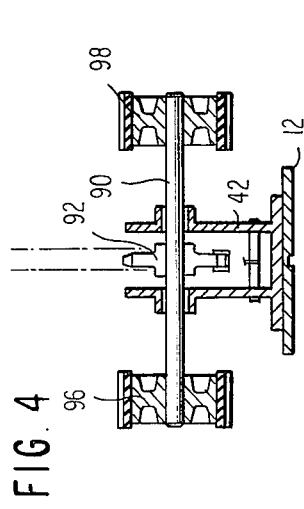

TREAD POWERED SKI

BACKGROUND OF THE INVENTION

1. Field of the Invention

This invention relates to ski devices and especially to ski devices having means for self-propulsion.

2. Discussion of Related Art

My prior U.S. Pat. Nos. 3,325,179 and 4,193,609, and my allowed U.S. patent application Ser. No. 951,443, which are all incorporated herein by reference thereto, disclose ski devices having pivoted seats mounted thereon for use on snow and other appropriate surfaces. My allowed application shows the basic ski and seat structure with various propulsion devices attached thereto. These propulsion devices include jet engines and various propeller driven arrangements for pushing the structure along the support surface. I have discovered that these types of propulsion arrangements, while useful, may possibly pose hazards that can injure the unwary. Consequently, I have developed a new propulsion system utilizing ground-engaging treads which are inherently less dangerous.

Various forms of tread propelled snow vehicles have been suggested in the past. For instance, U.S. Pat. No. 4,175,627 issued Nov. 27, 1979 to Husted shows a propulsion system for a snow going device comprising a roller chain carrying a plurality of cleats. The roller chain is powered by a small engine. The snow going device itself includes a steerable front ski and a fixed rear ski, to the rear of which the engine and roller chain are mounted. In the Husted device, propulsion is dependent upon one single tread which is completely isolated to the rear of the skis. This configuration can conceivably result in forcing a "bogging" or "mushing" effect upon the front of the device.

U.S. Pat. No. 4,162,008 issued July 24, 1979 to Best et al shows a powered snow ski with a forward steering mechanism having a depending rudder controlled by an upstanding handle bar. The rearward portion of the ski carries a motor mechanically linked to the drive roll of a belt drive depending through an opening in the rearward portion of the ski to contact an underlying supportive snow surface. The short drive belt unit of Best would appear to have a well drilling effect through a hole or door in the middle of what should be an uninterrupted ski gliding surface.

U.S. Pat. No. 2,706,528 issued Apr. 19, 1955 to Kallieo shows a snow going device having a single runner 10 containing an engine mounted on the back thereof. A drum or chain with cleats is mounted to the rear of the ski and is driven by the engine to power the ski. As with the Husted device, the disposition of the driving structure to the rear of the ski results in poor performance.

Other patents of which I am aware and which may be of interest are U.S. Pat. Nos. 2,378,111 to Tucker et al; 2,867,991 to Brandli; and 3,809,173 to McLeod.

OBJECTS OF THE INVENTION

One object of the present invention is to provide a propulsion system for a ski which produces smooth, effective powered movement of the ski.

Another object of the present invention is to provide a self-propelled ski having a surface contacting propulsion system wherein the surface penetration of the propulsion system can be adjusted to accommodate various conditions.

A further object of the present invention is to provide a self-propelled ski having a propulsion system which does not limit the length of the ski being used thereby enabling the weight distribution of the rider and of the components of the device to be distributed over greater surface area.

Yet another object of the present invention is to provide a propulsion system which can be used with equal effect on either a single ski system or upon a ski arrangement having a forward steerable runner and a rear fixed runner.

Yet another additional object of the present invention is to provide a self-propelled ski having a propulsion system which can be easily engaged with the ski support surface to provide thrust or can be disengaged from the support surface to allow the ski to glide due to or progress under the natural force of gravity.

A further object of the present invention is to provide a self-propelled ski which is efficient and effective in use and also provides a maximum of safety and durability.

SUMMARY OF THE INVENTION

In accordance with the above and other objects of the invention, my tread powered ski comprises at least one elongated runner with a seat fastened to the runner for supporting a rider thereon. First and second continuous treads are disposed on opposite lateral sides of the runner and are adapted for ground engagement to produce powered movement of the ski. An engine is mounted above the treads and is connected thereto by a power train which produces positive power transfer to the treads.

In accordance with other objects of the present invention, the treads are mounted on a chassis which is pivotally mounted at its forward end to the runner. A lifting apparatus is connected between the ski and chassis for moving the chassis and connected treads between a ground-engaging position for propelling the ski and a non-ground engaging position for allowing gliding or gravity induced movement of the ski.

The lifting apparatus can be in the form of a powered jack arrangement such as a hydraulic cylinder operated by a switch disposed near handle bars of the invention. Automatic operation of the power jack can also be included for raising the chassis and associated treads when the rpm of the treads is within a predetermined value. Alternatively, the chassis can be raised by a manually actuable apparatus such as a cord or cable strung between the chassis and the seat arrangement of the invention.

Additional features of the invention include the use of limit stops which control the vertical height of the treads in relation to the ski thereby controlling the depth of penetration of the treads into the surface being traversed. These limit stops can be adjustable to allow compensation for differing terrain or snow cover depths. Advantageously, the limit stops are in the form of tranversely curved mating members, one resting upon the other to allow the ski to flex transversely according to its design.

The seat is mounted to the ski at a position slightly to the rear of the longitudinal center of ski similar to the location of the mounting of a ski binding if the ski were to be used conventionally by a stand-up skier. The chassis and associated treads are attached to the ski by the aforementioned pivot point which is located just slightly to the rear of the seat mounting. Accordingly, the forces transmitted from the chassis are delivered to the ski at an optimum position for producing a pulling as well as a pushing effect. This propulsion force originates from within the parameters of the ski or runner guide plane and thus constitutes a force working in conjunction with the natural ski glide tendencies to produce the ultimate in performance.

BRIEF DESCRIPTION OF THE DRAWINGS

Various objects, features and attendant advantages of the present invention will be more fully appreciated as the invention becomes better understood from the following detailed description considered in connection with the accompanying drawings in which like reference numerals represent similar or identical parts throughout and wherein:

FIG. 1 is a side elevational view of a preferred embodiment of the tread powered ski of the present invention;

FIG. 2 is a rear elevational part fragmentary view of the seat and shock-absorber arrangement of the tread propelled ski;

FIG. 3 is a second embodiment of the tread powered ski showing a pull cord arrangement for lifting the drive chassis;

FIG. 4 is an enlarged transverse sectional view taken substantially along the plane passing through section lines 4—4 of FIG. 1 showing the tread drive arrangement;

FIG. 5 is an enlarged transverse sectional view taken substantially along the plane passing through section line 5—5 of FIG. 1 showing the bogie wheel arrangement;

FIG. 6 is an enlarged transverse sectional view taken substantially along a plane passing through section line 6—6 of FIG. 1 showing the forward chassis downward limit stop;

FIG. 7 is an enlarged transverse sectional view taken substantially along a plane passing through section line 7—7 of FIG. 1 showing the idler wheel arrangement;

FIG. 8 is an enlarged rear view taken along line 8—8 showing the rear downward limit control;

FIG. 9 is a part fragmentary side elevational view of the chassis showing an optional slide rail track to replace the forward bogie wheels; and FIG. 10 is a fragmentary front elevational view of the chain guard.

DETAILED DESCRIPTION OF THE PREFERRED EMBODIMENTS

Now with reference to the drawings, a tread powered ski incorporating the principles and concepts of the present invention and generally referred to by the reference numeral 10 will be described in detail.

As set forth in additional detail in my aforementioned allowed U.S. patent application Ser. No. 951,443 and U.S. patent No. 4,193,609, the ski device of the present invention comprises a runner 12 having an upwardly curved front end 14 and a rear end 16. An upright seat chassis 20 is mounted to the central section 18 of the runner 12. Chassis 20 includes a curved front edge 22 which is pivotally attached at 34 to hinge bracket 29. The chassis 20 further includes a central, upwardly curved lower edge 24 which terminates in a rearwardly positioned and downwardly extending bracket 36. A relatively straight rear edge 26 extends upwardly from the bracket 36 and then outwardly to form a rearmost edge or protrusion 27. The seat chassis 20 also includes an upper edge 28 which extends from the forward tip of the ski device rearwardly and upwardly to a seat 66. A seat chassis anti-sway linkage including upper arm 38 and lower arm 40 connects the seat chassis 20 through bracket 36 to the ski through lower bracket 42. Upper arm 38 and lower arm 40 are pivotally connected by pin 50. The upper arm 38 is connected to the bracket 36 at pivot point 94 while lower arm 40 is connected to bracket 42 at pivot point 48. The structure and function of this anti-sway linkage is described in my aforementioned patent and allowed application.

The ski device 10 also includes a single shock-absorber as described in my aforementioned patents, or a dual shock-absorber structure as set forth in my aforementioned allowed patent application and shown in FIG. 2 hereof. The dual shock-absorber structure shown includes a pair of shock-absorbers 44 and 46 which are pivotally mounted to the underside of the seat 66 by brackets 58 and 60. The lower end of said shock-absorber is pivotally mounted to the bracket 42 as generally depicted in FIG. 1.

Alternatively, the upper end of each of the shock-absorbers 44, 46 can be mounted directly to the rear protrusion 27 by laterally extending brackets, one of which is shown in phantom in FIG. 2 at 52. This latter structure is also described in my aforementioned allowed patent application. By the mounting of the shock-absorbers to the protrusion 27, the seat 66 can be made hingedly attached to the seat chassis 20 thereby enabling it to be swung to a storage or transportation position when not in use. This hinged attachment can be seen in FIG. 2 and is effected by the use of hinge 62 which connects the seat to the seat chassis, and latch 64, which can be any standardly available latching arrangement and is used to hold the seat in its operative position. By releasing latch 64, the seat can be swung upwardly, thus facilitating storage of the device.

Also, with reference to FIGS. 1 and 2, it will be noted that the seat 66 has incorporated therein a roll bar assembly for the protection of the rider. The roll bar assembly includes a tubular upright section 68, the upper portion of which extends slightly above the position of the head of a rider and is bent into a uniform and somewhat acute angled arc. The lower ends of the section 68 attach to the rear of the cushioned support surface 70. A second tubular roll bar section 72 has lower ends which are attached to the handle bars 74. Section 68 extends rearwardly and is connected to section 72 at the points of intersection shown at 76. The uppermost extremity of section 72 forms a smooth curved arc below and to the rear of the upper portion of section 68. Bracing 78 extends between section 68 and 72 and rigidifies the roll bar structure.

Again with reference to FIG. 1, the propulsion system for the present invention will now be discussed in detail. The propulsion system includes an engine 80 which is mounted in any convenient manner to the seat chassis 20. Engine 80, as shown, constitutes an internal combustion type engine but any other suitable power source, such as an electric motor, may be used. The engine is provided with an output shaft 82 which rotates in a conventional manner and has attached thereto a pulley or sprocket 84 for rotation therewith. A chain or belt 86 extends from pulley or sprocket 84 to the drive carriage 88 for transmission of power thereto. The carriage includes a drive shaft axle 90 shown most clearly in FIG. 4. Axle 90 is rotatably mounted in the rear of bracket 42 and contains an axle drive sprocket or pulley 92 which receives belt or chain 86 in a conventional manner. Mounted on the outer ends of the axle 90 are the track belt drive sprockets 96 and 98 which rotate with the shaft 90. As shown, sprocket or pulley 92 is mounted in the center of shaft 90 between two upright walls of the mounting bracket 42. This configuration is preferable but is not essential and can be varied as desired. The sprockets 96 and 98 are mounted on opposite sides of the mounting bracket 42 and are disposed beyond opposite lateral edges of runner 12. It is also contemplated that the sprocket 92 can contain a centrifugal clutch and/or a brake assembly for improved control.

Also shown in FIG. 1 is a drive assembly chassis 100 which is pivotally mounted about shaft 90. This chassis should be made of a lightweight durable material such as magnesium, aluminum, or the like, and constructed with sufficient reinforcing ribs or gussets to ensure rigidity. The chassis 100 mounts the majority of components of the drive assembly and serves to transmit power from the drive assembly through bracket 42 to the runner 12. The major constituent components mounted to the chassis include drive belts 102 and 104 which are mounted on bogie wheels 106 and 108 shown in FIG. 5, and idler wheels, one of which is shown at 110 in FIG. 1.

As shown in greater detail in FIG. 5, the drive assembly chassis 100 includes a cover plate 112 which is connected to depending lateral flanges 114 and 116 which extend down to cover the return portion of belts 102 and 104, respectively. A pair of depending laterally spaced mounting flanges 118 and 120 are also attached to the cover plate 112 and serve to support the bogie wheels 106 and 108 in the manner depicted in FIG. 5. Specifically, a bogie wheel chassis axle 122 is mounted through flanges 118 and 120 and in turn supports axle pivot arms 124 and 126. The wheels 106 themselves are rotatably mounted on wheel axles 128 and 130 respectively which are fixedly attached to pivot arms 124 and 126, respectively. The wheels are biased downwardly to maintain tension on the belts 104 and 108 by springs 128 and 130 which are tensioned between the flanges 118, 120 and axle 122. It should be noted with respect to FIG. 1 that the bogie wheels are mounted to the rear of and below the track belt sprockets thereby forcing the forward portion of each track belt to be inclined upwardly to facilitate movement through the snow or over uneven terrain. The lower portion of each track extending between the associated bogie wheel and idler wheel is designed to lay substantially horizontal.

The idler wheels are mounted as shown in FIGS. 1 and 7. A mounting bracket 132 is held to the cover plate 112 by two bolts 142 which extend into threaded apertures formed in the bracket. The bolts pass through elongated slots in the cover plate 112 so that the bracket may be moved forwardly or rearwardly of the chassis by simply loosening the bolts 142. A bracket 132 supports and journals idler arm upper axle 134 which passes through elongated slots 136 formed in the depending support flanges of the chassis. Slots 136 are elongated to accommodate forward and rearward movement of the axle 134. On opposite ends of axle 134, there are mounted idler wheel axle arms 138 and 140 which carry idler wheel axles 144 and 146. The idler wheels are rotatably mounted on the idler wheel axles. Clearly, with belts 102 and 104 disposed over the idler wheels, tension on the belts can be adjusted by simply loosening bolts 142 and moving the bracket 132 to the appropriate location. The idler wheels are biased downwardly by springs 148 and 150 which are connected between the bracket 132 and shaft 134.

As seen in FIG. 3, the carriage 88 can be pivoted upwardly. However, when the carriage is in its lowered position as seen in FIG. 1, it rests on the runner 18 with the height of the chassis above the runner being determined by the position of a pair of limit stops 152 and 154. Limit stop 152 is located generally of the carriage 88 and the details thereof are shown more clearly in FIG. 6. With reference to FIG. 6, it can be seen that the limit stop 152 comprises a slide saddle pillow 156 having a transversely curved upper surface. The pillow 156 can be permanently bonded to the runner or attached by any other suitable means. A limit control slide saddle 158 is attached between mounting flanges 118 and 120. Saddle 158 has a lower transversely curved surface which mates with the upper surface of pillow 156 and rests thereon to define the height relationship between the chassis 100 and runner 12. The mating transversely curved surfaces are utilized to allow the runner 12 to flex both transversely and longitudinally without affecting the position of the chassis. Height adjustment can be effected by loosening securing bolts 160 which extend through mounting flanges 118 and 120 into threaded apertures formed in the saddle 158. The openings in flanges 118 and 120 through which the bolts 160 extend are elongated in a vertical direction to allow vertical movement of the saddle 158.

The rearward limit stop 154 is shown more clearly in FIG. 8 to comprise rear slide saddle 160 which is mounted to the runner 12 and rear slide pillow 162 which is bolted to plate 164 extending between the depending flanges of the chassis. The bolts 166 extend through vertically elongated slots 168 formed in plate 164 and attach to nuts (not shown) on the opposite side of the plate. Accordingly, by loosening the nuts 166, the rear slide pillow 162 can be adjusted vertically. All of the slide pillows and slide saddles should be formed of a somewhat hard or firm material such as plastic or other low friction substance. Clearly, by adjusting the height of the chassis properly, the depth of penetration of tracks 102 and 104 can be controlled thereby limiting the tendency of the drive carriage to plow or become bogged down to deep snow.

The carriage is held in its lowered positioned shown in FIG. 1 by a spring 170 which is mounted to the chassis 100 through mounting boss 172 which depends from the cover plate 112 as shwon in FIG. 5. The spring extends downwardly and and forwardly and is connected to bracket 42 as shown in FIG. 1 at 174. Provision is made for raising the power carriage 88 for removing the drive belts 102 and 104 from ground contacting position as shown in FIG. 3. One means of performing this function is to attach a small double acting hydraulic cylinder 176 between the runner 12 and chassis 100 as depicted in FIGS. 1 and 3. This mounting is effected through the use of mounting bosses 178 and 180 attached to the runner and chassis, respectively. Naturally, if the cylinder is to be powered, a small hydraulic pump (not shown) and control (not shown) must be included. By actuating the cylinder, the carriage is raised and the runner 12 would progress by previously developed momentum or the influence of gravity.

An alternative structure for raising the carriage is shown in FIG. 3 and comprises a cable 182 attached to mounting boss 184 which extends upwardly from the cover plate of the chassis. Cable 182 is strung along guides 186 and terminates in handle 188 at the forward part of the seat chassis. Handle 188 can be secured to hook 190 for holding the carriage in the raised position or hook 192 for lowering the carriage. Accordingly, the raising and lowering operation can be performed manually by the rider by simply grasping handle 188 and moving it from one hook to another.

In order to maintain the carriage in alignment with runner 12, anti-sway linkage 198 is provided as shown in FIG. 1. This anti-sway linkage contains upper arm 200 and lower arm 202 which are pivotally interconnected by pin 204. Upper arm 200 is pivotally attached to a mounting boss extending from the rear of protrusion 27 by pin 206 and the lower arm is attached to the center chassis 100 by pin 208 which also passes through mounting base 184. The anti-sway linkage 198 ensures that the drive carriage 88 will faithfully maintain its lateral position with respect to runner 18 at all times thus improving the controllability of the ski 10.

FIG. 9 shows an alternative embodiment for use in place of bogie wheels 106 and 108. In place of each bogie wheel, a single elongated slide runner 210 is provided and mounted between axles 130 and 144. Slide runners 210 provide constant pressure along the entire running surface of the associated drive belt, thus improving traction of the device. Also, by pivotally mounting the slide runner 210, the slide runner can move up and down to accommodate variations in the terrain.

Also, optionally, the engine drive train can be mounted in a more forward position shown in FIG. 1 at 84'. This placement requires the use of an intermediate sprocket shown in phantom 85 to which chain 86 is connected. An intermediate chain 87 is then used to connect the sprocket 85 to the carriage drive sprocket 92. Clearly, the necessary repositioning of motor 80 and use of additional brackets would be obvious to one of ordinary skill in the art to accomplish this variational drive arrangement. This positioning of the drive train can be utilized, if necessary, to properly balance the tread powered ski.

Further, tensioners such as shown at 91 in FIG. 1 should be used with each drive belt or drive chain of the drive train. Each tensioner comprises a tensioner arm 93 which is pivotally mounted to bracket 36 by pin 94. At the distill end of the arm is a roller 95 which contacts one side of the associated belt or chain. The arm 93 is spring biased outwardly to tension the associated chain or belt.

If the alternate drive train configuration is used, it may be necessary to provide a chain guard. One embodiment of such a device is shown in FIGS. 1 and 10 at 250. The chain guard 250 is made from lightweight but sturdy material and is either fixedly attached or hingedly attached to each side of the mounting bracket 42. The chain guard depicted has a curved outer surface 252 mounted to the bracket 42 by two mounting struts 254 and 256 for deflecting the foot of a rider away from the associated chain.

Obviously, numerous modifications and adaptations of the present invention would be obvious to one of ordinary skill in the art in light of the above teachings. It is therefore to be understood that within the scope of the appended claims, the invention may be practiced otherwise than as specifically described herein.

I claim as my invention:

1. A powered ski apparatus, comprising:
    a single elongated runner having a forward end portion and a rear end portion;
    seat means fastened to said runner for supporting a rider thereon;
    track means for producing powered movement of said runner, said track means including first and second continuous treads disposed on opposite lateral sides of the rear end portion of said runner and adapted for ground engagement to produce said powered movement;
    engine means for providing a source of power for said track means, said engine means including an output shaft;
    power train means for connecting said output shaft to said first and second treads; and
    chassis means for supporting said first and second treads, said chassis means including a forward end and a rear end, said forward end being pivotally mounted to said runner about a chassis pivot axis.

2. The invention as defined in claim 1 and further including lifting means for raising said chassis and said treads about said chassis pivot axis into a non-ground engaging position.

3. The invention as defined in claim 2 and further wherein said lifting means includes a powered means responsive to an input to raise and lower said chassis.

4. A powered ski apparatus, comprising:
    at least one elongated runner;
    seat means fastened to said runner for supporting a rider thereon;
    track means for producing powered movement of said runner, said track means including first and second continuous treads disposed on opposite lateral sides of said runner and adapted for ground engagement to produce said powered movement;
    engine means for providing a source of power for said track means, said engine means including an output shaft;
    power train means for connecting said output shaft to said first and second treads;
    chassis means for supporting said first and second treads, said chassis means including a forward end and a rear end, said forward end being pivotally mounted to said runner about a chassis pivot axis;
    lifing means for raising said chassis and said treads about said chassis pivot axis into a non-ground engaging position, wherein said lifting means includes a powered means responsive to an input to raise and lower said chassis; and
    control means for producing an input to said powered means to raise said chassis when said treads are operated within a predetermined rpm.

5. The invention as defined in claim 1 wherein said chassis includes first limit means for engaging said runner and holding said chassis above said runner thereby controlling the relative vertical disposition of said treads and said runner.

6. A powered ski apparatus, comprising:
    at least one elongated runner;
    seat means fastened to said runner for supporting a rider thereon;
    track means for producing powered movement of said runner, said track means including first and second continuous treads disposed on opposite lateral sides of said runner and adapted for ground engagement to produce said powered movement;
    engine means for providing a source of power for said track means, said engine means including an output shaft;

power train means for connecting said output shaft to said first and second treads;

chassis means for supporting said first and second treads, said chassis means including a forward end and a rear end, said forward end being pivotally mounted to said runner about a chassis pivot axis;

wherein said chassis includes first limit means for engaging said runner and holding said chassis above said runner thereby controlling the relative vertical disposition of said treads and said runner; and wherein said first limit means includes relatively movable, mating arcuate surfaces for allowing said runner to flex relative to said chassis.

7. The invention as defined in claim 5 wherein said first limit means includes first adjustment means for changing the relative disposition of said treads and said runner.

8. The invention as defined in claim 5 wherein said first limit means is positioned medially of said chassis.

9. The invention as defined in claim 8 and further including second limit means positioned toward the rear of said chassis for engaging said runner and holding said chassis above said runner thereby controlling the relative vertical relationship of said runner and said treads.

10. A powered ski apparatus, comprising:
at least one elongated runner;
seat means fastened to said runner for supporting a rider thereon;
track means for producing powered movement of said runner, said track means including first and second continuous treads disposed on opposite lateral sides of said runner and adapted for ground engagement to produce said powered movement;
engine means for providing a source of power for said track means, said engine means including an output shaft;
power train means for connecting said output shaft to said first and second treads;
chassis means for supporting said first and second treads, said chassis means including a forward end and a rear end, said forward end being pivotally mounted to said runner about a chassis pivot axis;
wherein said chassis includes first limit means for engaging said runner and holding said chassis above said runner thereby controlling the relative vertical disposition of said treads and said runner;
second limit means positioned toward the rear of said chassis for engaging said runner and holding said chassis above said runner thereby controlling the relative vertical relationship of said runner and said treads; and
wherein said first limit means is positioned medially of said chassis; and
wherein said second limit means includes relatively movable mating arcuate surfaces for allowing said runner to flex relative to said chassis.

11. The invention as defined in claim 5 and further including a chassis anti-sway means extending between said seat means and said chassis for maintaining said chassis in alignment with said runner.

12. A powered ski apparatus, comprising:
at least one elongated runner;
seat means fastened to said runner for supporting a rider thereon;
track means for producing powered movement of said runner, said track means including first and second continuous treads disposed on opposite lateral sides of said runner and adapted for ground engagement to produce said powered movement;
engine means for providing a source of power for said track means, said engine means including an output shaft;
power train means for connecting said output shaft to said first and second treads;
chassis means for supporting said first and second treads, said chassis means including a forward end and a rear end, said forward end being pivotally mounted to said runner about a chassis pivot axis;
wherein said chassis includes first limit means for engaging said runner and holding said chassis above said runner thereby controlling the relative vertical disposition of said treads of said runner;
chassis anti-sway means extending between said seat means and said chassis for maintaining said chassis in alignment with said runner;
wherein said chassis anti-sway means includes first and second pivotally connected linkage arms, said first linkage arm being pivotally connected to said chassis, said second linkage arm being pivotally connected to said seat means.

13. The invention as defined in claim 5 and further including chassis hold down means comprising a resilient element extending between said chassis and said runner for holding said treads in a ground contacting position.

14. The invention as defined in claim 5 wherein said seat means includes a support surface attached to said runner and disposed for concentrating the majority of the weight of a rider slightly to the rear of the longitudinal center of said runner.

15. The invention as defined in claim 14 wherein said chassis is attached to the rear half of said runner.

16. The invention as defined in claim 2 wherein said lifting means comprises a manually actuable pull cord.

17. A vehicle for traversing a support surface, comprising:
a single elongated runner having a forward end portion and a rear end portion;
propulsion means attached to said rear end portion of said runner for contacting said support surface adjacent said runner to propel said runner, said propulsion means including a pair of treads disposed on opposite lateral sides of said runner; and
lifting means operatively engaging said propulsion means for moving said propulsion means between a support surface engaging thrust mode and a non-engaging coasting mode of operation while the vehicle is in motion.

18. The invention as defined in claim 17 and further including adjustment means for adjusting the height of said treads relative to said runner.

* * * * *